United States Patent
Jeong et al.

(10) Patent No.: US 11,875,035 B2
(45) Date of Patent: Jan. 16, 2024

(54) ELECTRONIC DEVICE AND METHOD FOR MANAGING MEMORY USING THE SAME

(71) Applicant: Samsung Electronics Co., Ltd., Gyeonggi-do (KR)

(72) Inventors: Kwanhee Jeong, Gyeonggi-do (KR); Hongjung Son, Gyeonggi-do (KR); Myungah Kim, Gyeonggi-do (KR); Hyojong Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 132 days.

(21) Appl. No.: 17/565,907

(22) Filed: Dec. 30, 2021

(65) Prior Publication Data
US 2022/0214809 A1    Jul. 7, 2022

Related U.S. Application Data

(63) Continuation of application No. PCT/KR2021/019732, filed on Dec. 23, 2021.

(30) Foreign Application Priority Data

Jan. 6, 2021    (KR) .................. 10-2021-0001428

(51) Int. Cl.
G06F 3/06    (2006.01)
(52) U.S. Cl.
CPC .......... *G06F 3/0604* (2013.01); *G06F 3/0644* (2013.01); *G06F 3/0673* (2013.01)
(58) Field of Classification Search
CPC ..... G06F 3/0604; G06F 3/0644; G06F 3/0673
See application file for complete search history.

(56) References Cited

U.S. PATENT DOCUMENTS

| | | | |
|---|---|---|---|
| 8,201,162 B2 | 6/2012 | Okachi et al. | |
| 9,747,296 B2 | 8/2017 | Subramanian et al. | |
| 9,870,364 B2 | 1/2018 | Joseph et al. | |
| 10,713,028 B2 | 7/2020 | Wiswall et al. | |
| 2004/0075864 A1* | 4/2004 | Kato | G06F 3/1265 358/1.14 |
| 2015/0120906 A1* | 4/2015 | Dowling | G06F 11/3409 709/224 |
| 2018/0336208 A1 | 11/2018 | Kim | |

FOREIGN PATENT DOCUMENTS

| | | |
|---|---|---|
| JP | 5-233233 A | 9/1993 |
| JP | 5900074 B2 | 4/2016 |
| JP | 2020-57150 A | 4/2020 |
| KR | 10-2005-0054314 A | 6/2005 |
| KR | 10-2006-0030269 A | 4/2006 |
| KR | 10-2018-0127695 A | 11/2018 |
| KR | 10-2020-0114233 A | 10/2020 |

OTHER PUBLICATIONS

Written Opinion dated Mar. 23, 2022.

* cited by examiner

*Primary Examiner* — Jae U Yu
(74) *Attorney, Agent, or Firm* — Cha & Reiter, LLC (57) ABSTRACT

According to certain embodiments, an electronic device comprises: a memory; and a processor operatively coupled to the memory, wherein the processor is configured to: identify a remaining capacity of the memory, and when the remaining capacity of the memory is less than a specified ratio of a total capacity of the memory, block compilation using a profile of an application, or delete an artifact created through compilation using the profile of the application.

20 Claims, 6 Drawing Sheets

ELECTRONIC DEVICE AND METHOD FOR MANAGING MEMORY USING THE SAME

CROSS REFERENCE TO RELATED APPLICATION

This application is a Continuation of and based on and claims priority under 35 U.S.C. § 120 to PCT International Application No. PCT/KR2021/019732, which was filed on Dec. 23, 2021, and claims priority to Korean Patent Application No. 10-2021-0001428, filed on Jan. 6, 2021, in the Korean Intellectual Property Office, the disclosures of which are incorporated by reference herein their entirety.

BACKGROUND

Technical Field

Certain embodiments of the disclosure relate to an electronic device and method for managing a memory using the same.

Description of Related Art

As an electronic device performs many functions within a limited memory capacity, a memory shortage situation may occur. For example, when the remaining capacity of the memory becomes less than a certain amount, the electronic device may provide a notification. The notification may notify the user of the need to free up available space of the memory. In order to free up space in the memory, the user may delete files, packages, data of packages, and cache files stored in the electronic device.

SUMMARY

As an application package is installed, artifacts may be created. Even though some artifacts are not used for a long time, there appears to be no method to delete them. Also, the notification of the need to free up available space of the memory might only be provided when the remaining capacity of a memory is less than or equal to a specified capacity. As a differential operation for securing available memory space (a backup where all changes since the most recent full backup are backed up) is not provided, not only input or output processing is delayed, but also the usability of an electronic device may deteriorate.

The electronic device according to certain embodiments of the disclosure may block compilation using an application profile, or may selectively delete artifacts created by compilation, based on the remaining capacity of the memory being less than a specified ratio.

The electronic device according to certain embodiments of the disclosure, may restore the deleted artifact by compiling the package from which the artifact was deleted, or by recompiling using the application profile when the remaining capacity of the memory is greater than or equal to a specified capacity.

According to certain embodiments, an electronic device comprises: a memory; and a processor operatively coupled to the memory, wherein the processor is configured to: identify a remaining capacity of the memory, and when the remaining capacity of the memory is less than a specified ratio of a total capacity of the memory, block compilation using a profile of an application, or delete an artifact created through compilation using the profile of the application.

According to certain embodiments, a method for managing a memory of an electronic device comprises: identifying a remaining capacity of the memory; and when determining that the remaining capacity of the memory is less than a specified ratio of a total capacity of the memory, blocking compilation using a profile of an application, or deleting an artifact created by performing the compilation using the profile of the application.

DETAILED DESCRIPTION

The electronic device according to certain embodiments of the disclosure, based on the remaining capacity of the memory, blocks compilation using the profile of an application or by selectively deleting an artifact generated through compilation. The foregoing not only systematically secures the available space of the memory, but also prevents input or output performance degradation that may occur due to the limitation of the available space of the memory.

The electronic device according to certain embodiments of the disclosure, when the remaining capacity of the memory is secured to be greater than or equal to a specified capacity, by compiling the package from which the artifact has been deleted, or by restoring the artifact deleted through recompilation using the application profile, may prevent performance degradation when using the application.

Figure 1:
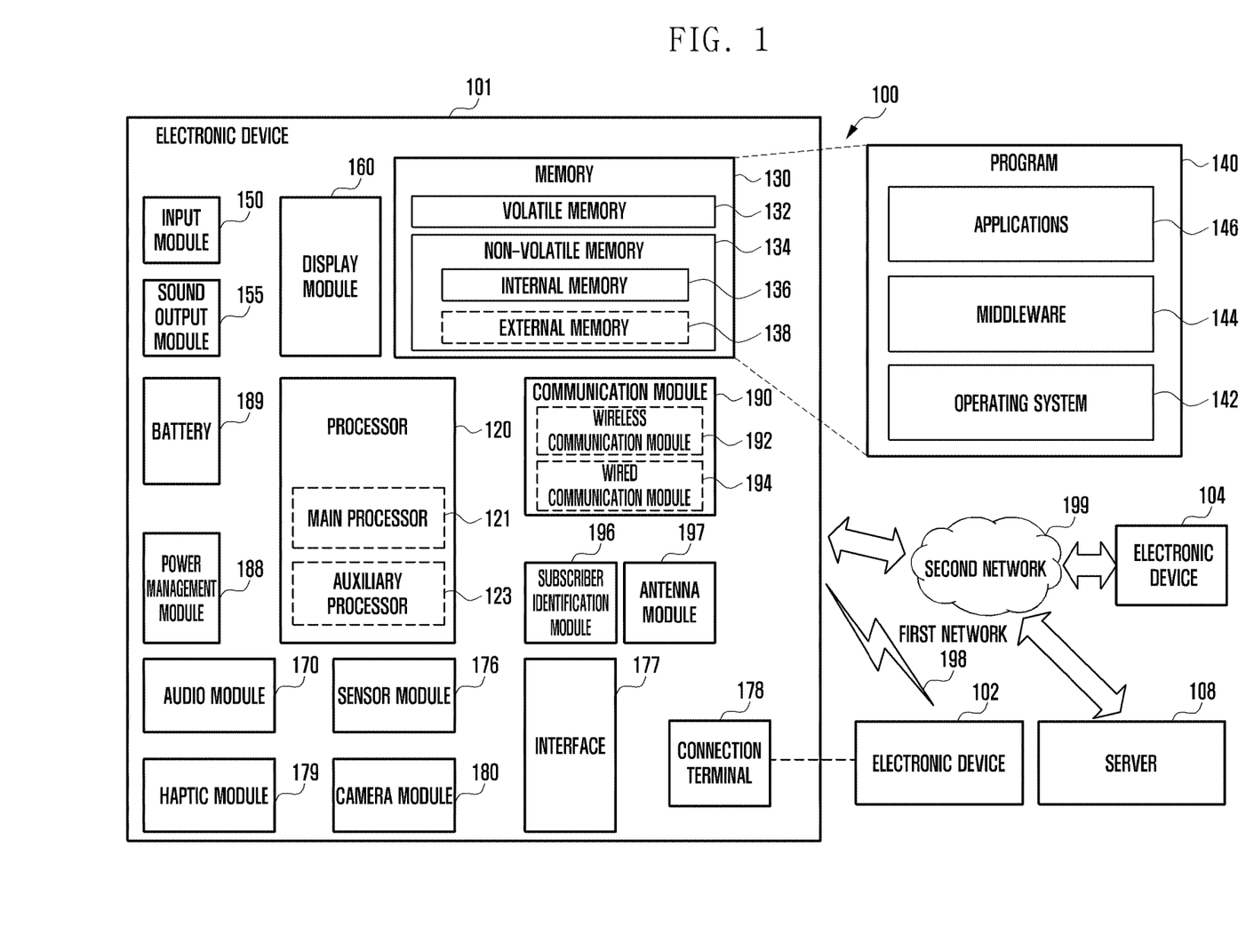
FIG. 1 is a block diagram illustrating an electronic device in a network environment according to certain embodiments of the disclosure.

FIG. 1 is a block diagram of an electronic device which systematically frees up available space of the memory, and prevents input or output performance degradation due to the limitation of the available space of the memory. The electronic device, based on the remaining capacity of the memory, blocks compilation of an application using a profile of the application or selectively deletes an artifact generated through compilation.

The electronic device 101 identifies a remaining capacity of a memory 130, and when determining that the remaining capacity of the memory 130 is below a specified ratio, either blocks complication of an application using the profile of the application, or deletes an artifact created by performing complication using a profile of an application.

FIG. 1 is a block diagram illustrating an electronic device 101 in a network environment 100 according to certain embodiments of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network).

According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121. The term "processor" shall be understood to refer to both the singular and plural context in this document.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and/or an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) (e.g., speaker or headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., through wires) or wirelessly. According to an embodiment, the interface 177 may include, for example, a high-definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., an application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., an mmwave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology. As the memory 130 becomes consumed, the electronic device 101 frees up available memory space, thereby avoiding degradation of performance.

Figure 2:
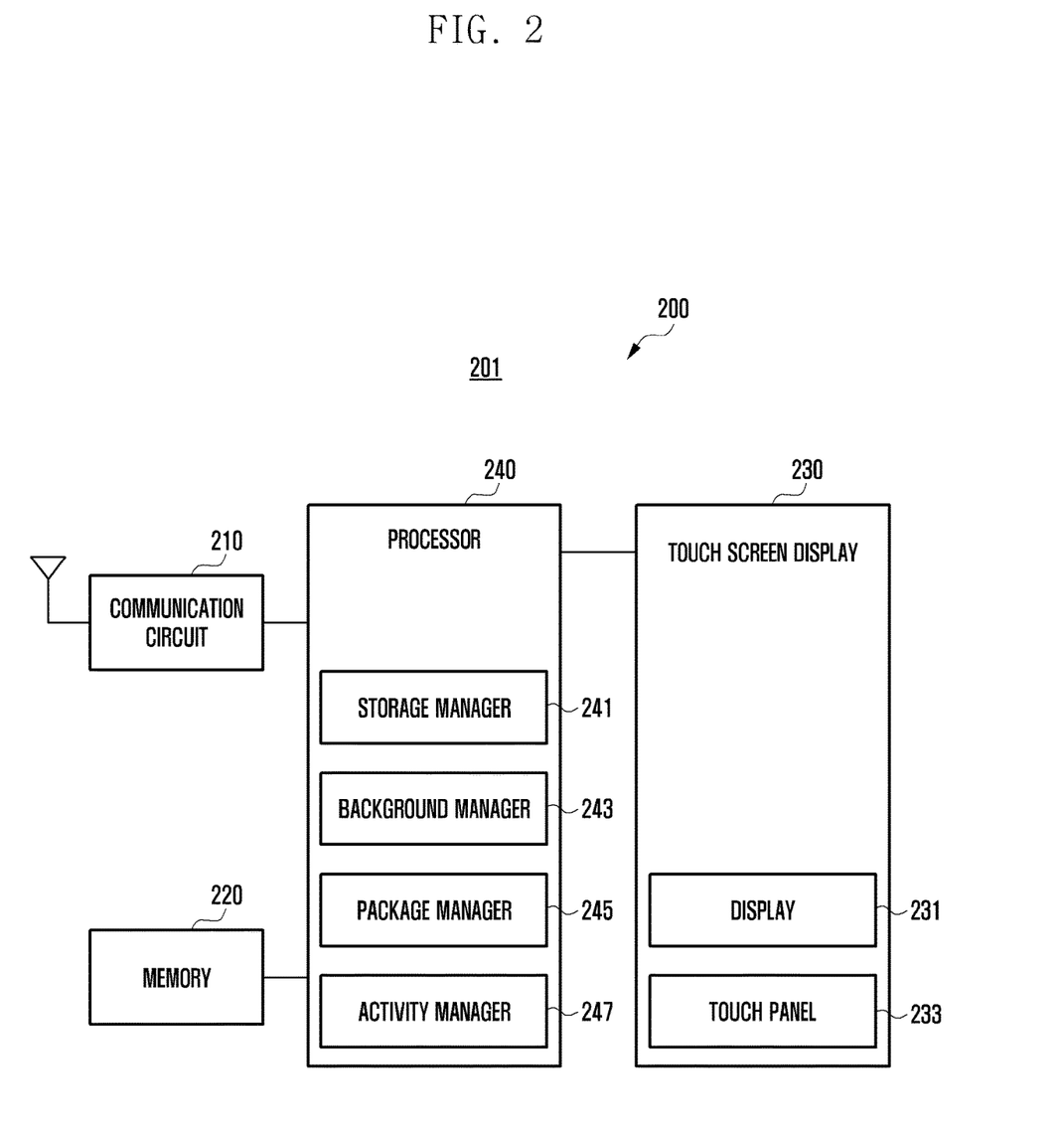
FIG. 2 is a block diagram illustrating an electronic device according to certain embodiments of the disclosure.

FIG. 2 is a block diagram 200 illustrating an electronic device 201, according to certain embodiments.

With reference to FIG. 2, the electronic device 201 (e.g., the electronic device 101 of FIG. 1) may include a communication circuit 210 (e.g., communication module 190 of FIG. 1), a memory 220 (e.g., memory 130 in FIG. 1), a touch screen display 230 (e.g., display module 160 of FIG. 1), and a processor 240 (e.g., processor 120 of FIG. 1).

The communication circuit 210 (e.g., the communication module 190 of FIG. 1) may establish a communication channel with an external electronic device (e.g., the electronic devices 102 and 104, the server 108 of FIG. 1), and with the external electronic device it may support various data being transmitted and received.

In one embodiment, the communication circuit 210, under the control of the processor 240, may receive (or download) an update file (e.g., an installation file (e.g., apk (android application package) file)) from a server (e.g., App Store).

The memory 220 (e.g., the memory 130 of FIG. 1) may store instructions for differentially performing different operations for securing an available space of the memory 220 based on the remaining capacity of the memory 220. The memory 220 may store instructions for performing different operations for restoring differentially deleted artifacts when the remaining capacity of the memory 220 is secured at a specified ratio or more.

The touch screen display 230 (e.g., the display module 160 of FIG. 1) may be integrally configured including the display 231 and the touch panel 233.

In one embodiment, the touch screen display 230, under the control of the processor 240, may display a user interface. The user interface can include a notification for of the need to free up available space of the memory 220.

The processor 240 (e.g., the processor 120 of FIG. 1) may include, for example, a microcontroller unit (MCU) and may control a plurality of hardware components connected to the processor 240 by driving an operating system (OS) or embedded software program. The processor 240 may control a plurality of hardware components according to, for example, instructions stored in the memory 220 (e.g., the program 140 of FIG. 1).

The processor 240 may identify (e.g., check) the remaining capacity of the memory 220. For example, the processor 240 may receive capacity information corresponding to a ratio of the usable capacity of the memory 220 through the storage manager 241.

The processor 240 may identify the remaining capacity of the memory 220 based on detecting a request to delete a specified time interval or artifact. The artifact may include a native file (or native code) such as *.vdex, *.odex, or *.oat or an initialization image for application class information such as *.art.

The processor 240 may identify whether the remaining capacity of the memory 220 to the total capacity of the memory, is less than a specified ratio. The specified ratio may include a ratio of available capacity among the total capacity of the memory 220. A specified ratio may be a plurality of specified ratios.

When the remaining capacity of the memory 220 is less than the specified ratio, the processor 240 may block compilation using the profile of the application, or it may delete the created artifact by performing compilation using the profile of the application. For example, if it is confirmed that the remaining capacity of the memory 220 is between a first specified ratio and a second specified ratio, the processor 240 may block compilation using the profile of the application executed through the background manager 243.

When the remaining capacity of the memory 220 is between the second specified ratio and third specified ratio, the processor 240 deletes an artifact. The processor 240 identifies a path, through the package manager 245. The path is the one where the artifact generated by the unused system package is located as the update is completed. The processor 240 can delete the artifact located in the path.

When the remaining capacity of the memory 220 is confirmed to be less than a third specified ratio, the processor 240 may identify a list of packages of applications installed in the electronic device 201. The processor 240 may identify the list through the package manager 245. The processor 240 may identify the package of an application not in use for a specified period through the activity manager 247. The processor 240 may delete an artifact generated by performing compilation using a profile of a package of an application that is not in use for a specified period.

The processor 240 determines (e.g., identifies, checks) whether the remaining capacity of the memory 220 is greater than or equal to a specified ratio. Based on the confirmation of the specified ratio or more, it may restore the deleted artifact by compiling the package from which the artifact was deleted, or by recompiling using the application profile.

For example, if the remaining capacity of the memory 220 is determined to be greater than or equal to the third specified ratio, the processor 240 may compile the package from which the artifact was deleted. If the remaining capacity of the memory 220 is determined to be greater than or equal to the second specified ratio, the processor 240 may restore the deleted artifact through recompilation using the profile of the application.

Figure 3:
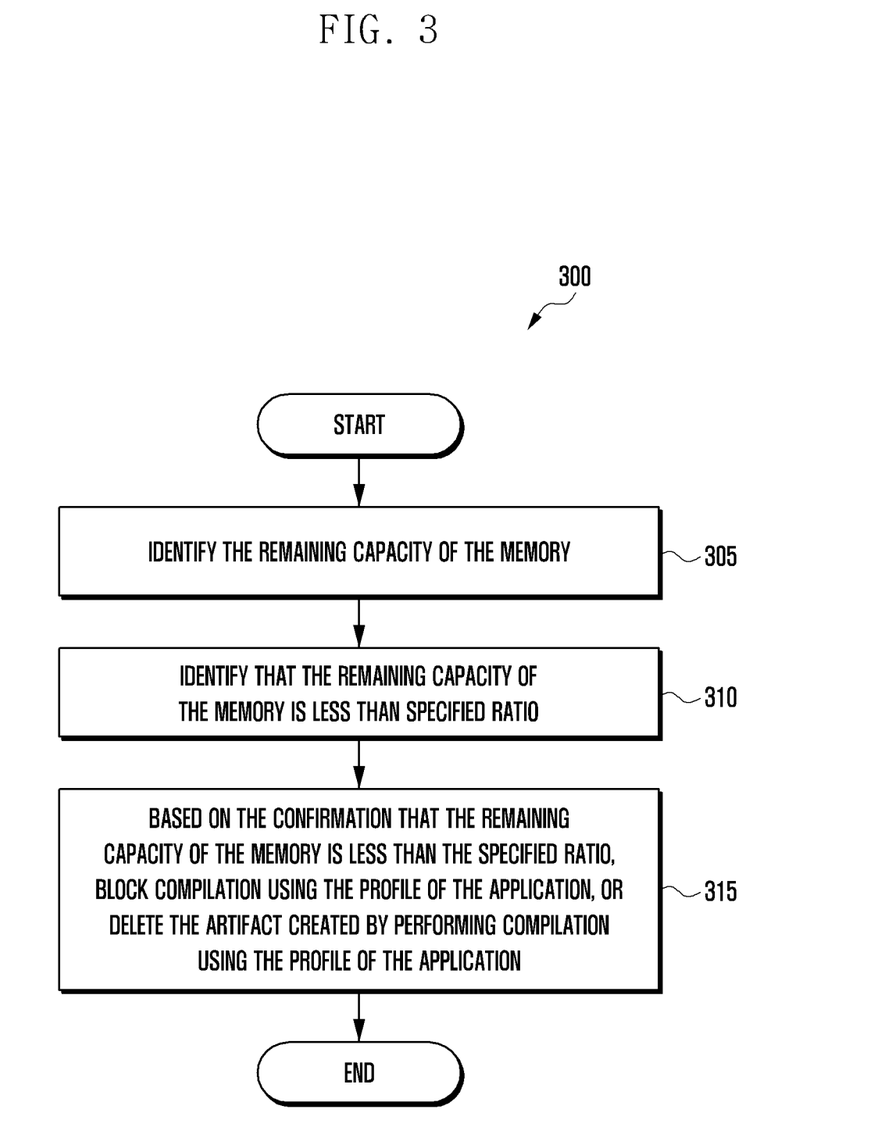
FIG. 3 is a flowchart illustrating a method of managing a memory based on the remaining capacity of the memory, according to certain embodiments of the disclosure.

FIG. 3 is a flowchart 300 for explaining a method of managing the memory 220 based on the remaining capacity of the memory 220, according to certain embodiments.

With reference to FIG. 3, in operation 305, the processor (e.g., the processor 240 of FIG. 2) of the electronic device (e.g., the electronic device 201 of FIG. 2) may identify (e.g., check) the remaining capacity of a memory (e.g., the memory 220).

The operation of identifying the remaining capacity of the memory 220 of operation 305 described above according to certain embodiments may be performed at a specified time interval. But it is not limited to this. For example, based on detecting an input requesting deletion of an artifact (e.g., an input requesting execution of a service to delete artifacts) generated through compilation using an application profile, the processor 240 may perform an operation to identify the remaining capacity of the memory 220 in operation 305 described above.

In certain embodiments, the artifact may include a native file (or native code) such as either or both *.vdex, *.odex, or *.oat and initialization image of an application class information such as *.art.

In one embodiment, the processor 240, based on the application update, through a communication circuit (e.g., the communication circuit 210 of FIG. 2), may receive (or download) an update file (e.g., installation file (e.g. apk (android application package) file)) from a server (e.g., App Store). For example, an application may be developed in a specific programming language (e.g., Java language), and resource files (e.g., Java source code, layout xml file, image file, audio file, animation, menu, style, and color) may be created as update files (e.g. apk files) by a software development key (SDK). The update file indicates an Android package, and the extension can be expressed as ".apk." For example, one apk file may represent one application and may be a file installed in the electronic device 201.

In one embodiment, *.vdex may include an uncompressed bytecode (e.g., dex code) of an update file (e.g., apk (android application package)) of the aforementioned application. Either or both *.odex or .oat may include a compiled (e.g. ahead of time (AOT) compile) code for methods defined in executable files (e.g. .dex) of the aforementioned application's update files (e.g. installation files (e.g. .apk)). Also, *.art may include the ART (android runtime) internal representation of some strings and classes listed in the executable file (e.g., .dex) in the update file (e.g., apk) of the aforementioned application.

In operation 310, the processor 240 may identify (e.g., determine) whether the remaining capacity of the memory 220 is less than a specified ratio. For example, the processor 240 may transmit the specified ratio to the storage manager (e.g., the storage manager 241 of FIG. 2) as a parameter. The storage manager 241 may transmit capacity information of the memory 220 corresponding to the specified ratio to the processor 240. The processor 240 may identify whether the remaining capacity of the memory 220 is less than the capacity of the memory 220 corresponding to a specified ratio received from the storage manager 241.

The specified ratio may include a ratio of usable capacity among the total capacity of the memory 220. The specified ratio may be a plurality of specified ratios. The plurality of specified ratios may include a first specified ratio, a second specified ratio, and a third specified ratio. But it is not limited to this.

The first specified ratio may be greater than the second specified ratio, and the second specified ratio may be greater than the third specified ratio. For example, the first specified ratio may represent a case in which the usable capacity among the total capacity of the memory 220 is 8%. The second specified ratio may be 5%. The third specified ratio be 1%. The foregoing are provided by way of example, and not limitation.

The first to third specified ratios may be predetermined by the manufacturer, or may be changeable settings.

The numerical values of the first specified ratio to the third specified ratio are for ease of explanation, and they are not limited to the numerical values of the aforementioned ratios.

The processor 240, in operation 315, may block the execution of compilation using the profile of the application, or delete the artifact created by performing the compilation using the profile of the application based on the identification that the remaining capacity of the memory 220 is less than a specified ratio.

For example, if it is confirmed that the remaining capacity of the memory 220 is between the first specified ratio (e.g., 8%) and the second specified ratio (e.g., 5%) (or less than the first specified ratio, but greater than the second specified ratio), the processor 240 may block compilation using the profile of the application. By blocking the execution of compilation using the profile of the application, it is possible to prevent the artifact from being generated.

As another example, if it is confirmed that the remaining capacity of the memory 220 is between the second specified ratio (e.g., 5%) and the third specified ratio (e.g., 1%) (or less than the second specified ratio, but greater than the third specified ratio), the processor 240 may delete the artifact generated by performing compilation using the profile of the application. For example, an artifact may be generated by performing an application update; and, as the update is completed, a system package for application update might not be used. The processor 240 may delete artifacts generated by unused system packages as the update is completed.

As another example, if it is confirmed that the remaining capacity of the memory 220 is less than the third specified ratio (e.g., 1%), the processor 240 may obtain a list of packages of applications installed in the electronic device 201. The processor 240 may delete an artifact generated by performing compilation using a profile of a package of an application that satisfies a specified condition from the acquired list. For example, an application that satisfies the specified condition may include an application that has not been used for a specified period. This can be determined based on whether an application icon exists, whether an event related to the use of the application occurs, and whether a function supported by the application is activated.

In connection with operation 315 of FIG. 3 described above according to certain embodiments, certain embodiments will be described with reference to FIG. 4 to be described later.

Figure 4:
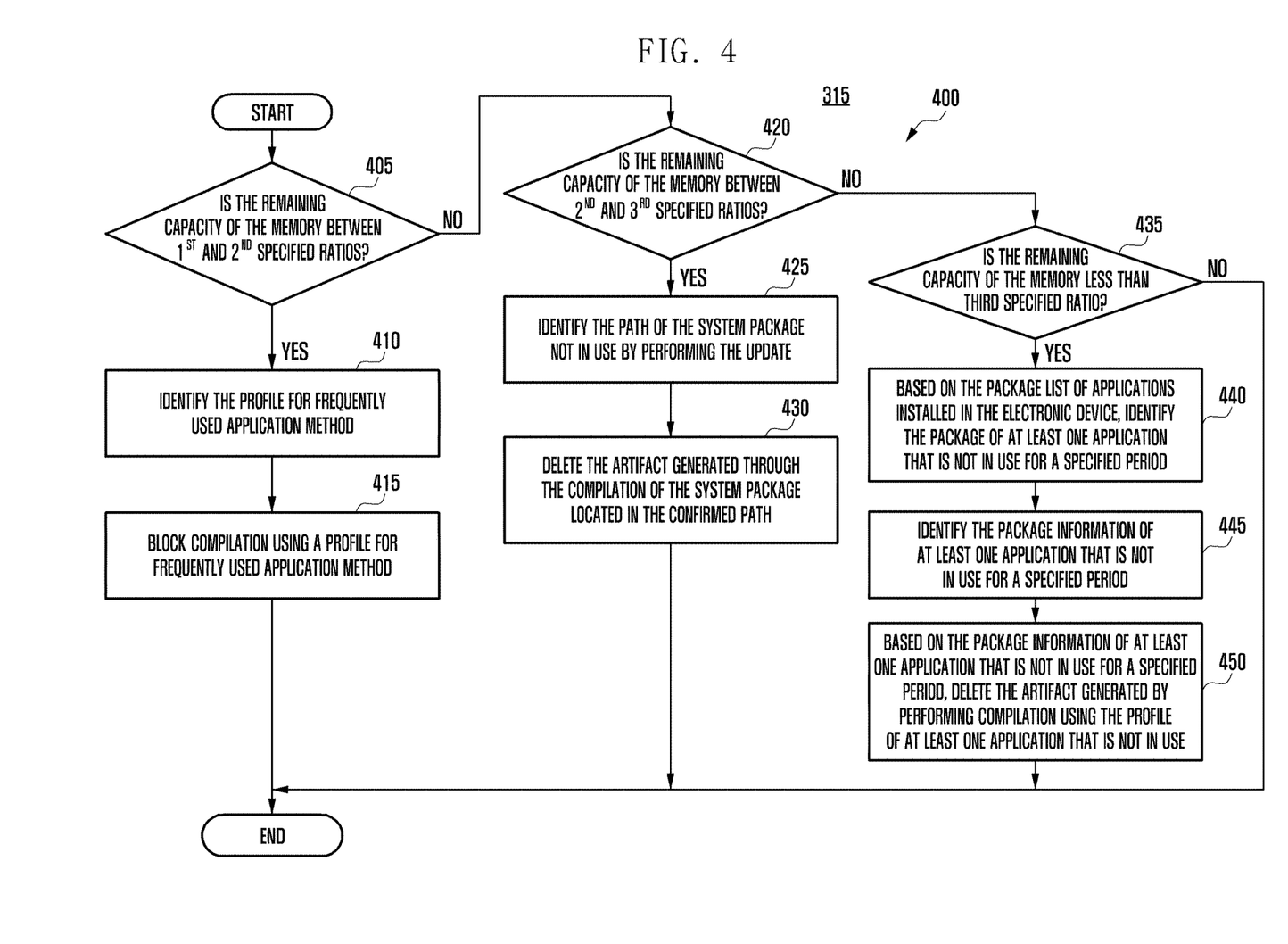
FIG. 4 is a flowchart for explaining operation 315 of FIG. 3, according to certain embodiments.

FIG. 4 is a flowchart 400 for explaining operation 315 of FIG. 3, according to certain embodiments.

With reference to FIG. 4, in operation 405, the processor (e.g., the processor 240 of FIG. 2) of the electronic device (e.g., the electronic device 201 of FIG. 2) may determine (e.g., identify) whether the remaining capacity of the memory 220 is between the first specified ratio and the second specified ratio (or less than the first specified ratio, but greater than the second specified ratio). According to certain embodiments, the first specified ratio may be 8% of the total capacity of the memory 220 and the second specified ration may be 5%. The foregoing is provided by way of example, and not limitation.

If the remaining capacity of the memory 220 is between the first specified ratio and the second specified ratio (e.g., YES in operation 405), the processor 240 in operation 410, may identify the profile for the method of the frequently used application. For example, the processor 240 may identify a profile for a method of a frequently used application through a background manager (e.g., the background manager 243 of FIG. 2).

In an embodiment, the processor 240 may block in operation 415 compilation using a profile of a frequently used application.

The operation of blocking compilation performance according to certain embodiments may include an operation of blocking compilation execution based on the updated profile. For example, the background manager 243 of the processor 240 may compile executable files (e.g., .dex files) in the package of the application using a designated converter tool (e.g., dex2oat tool) in the background based on a profile generated while the user uses the electronic device 201. An artifact, for example, either or both an .oat or .art file may be regenerated by compilation, and the performance of the application may vary depending on either or both the compiled method or class. For example, the background dex optimization may create a new .oat and .art file that is optimized when a condition specified in jobscheduler (e.g., charging, idle state, or once a day) is satisfied. The processor 240, through runtime, using a specified compilation method (e.g., ahead of time (AOT) compilation) for the new profile, may create a native code (e.g., either or both *.odex or *.oat) and an initialization image (e.g. *.art) for application class information. In one embodiment, the native code may represent compiled code for byte code, and it may include compiled machine code.

In certain embodiments, the processor 240 may block execution of compilation based on the profile of the application that may be executed by the background manager 243 described above. As the compilation using the profile of the above-described application is blocked, an artifact by compilation may not be generated. As an artifact by compiling is not generated, the available space of the memory 220 may be secured.

The operation of blocking compilation may include an operation of blocking compilation from being performed on a package of a deleted application when the electronic device 201 is rebooted. For example, the processor 240 may block compilation based on a profile that may be performed through the background manager 243 when the electronic device 201 is rebooted. By blocking the execution of compilation using the profile of the application, it is possible to prevent the artifact from being generated.

In certain embodiments, when installing an application, it may be set so that an artifact can be generated by performing compilation using the profile of the application up to a specified capacity (e.g., 500 MB).

In one embodiment, if the remaining capacity of the memory 220 is not between the first specified ratio and the second specified ratio (e.g., NO in operation 405), the processor 240, in operation 420, may determine (e.g., identify) whether the remaining capacity of the memory 220 is between the second specified ratio and a third specified ratio (less than the second specified ratio, but higher than the third specified ratio). According to certain embodiments, the second specified ratio may be 5% and the third specified ratio may be 1%. The foregoing are provided by way of example and not limitation.

If the remaining capacity of the memory 220 is between the second specified ratio and third specified ratio (e.g., YES in operation 420), the processor 240 in operation 425, may identify the path of the system package not used to perform the update. The processor 240 may identify the set installation path (e.g., /data/dalvik-cache) of the updated system package through a package manager (e.g., the package manager 245 of FIG. 2) in order to delete an artifact generated based on the updated system package.

In operation 430, the processor 240 may delete an artifact generated through compilation of a system package located in the confirmed path. For example, the processor 240 may delete artifacts (e.g., either or both odex, vdex, or art) located in the installation path (e.g., /data/dalvik-cache) confirmed through the package manager 245.

As the update is completed, the system package for the application update may not be used, and the available space of the memory 220 may be secured by deleting the artifact generated by the unused system package.

When the remaining capacity of the memory 220 is not between the second specified ratio and the third specified ratio (e.g., NO in operation 420), the processor 240 may determine (e.g., identify) in operation 435 whether the remaining capacity of the memory 220 is less than the third specified ratio.

If the remaining capacity of the memory 220 is less than the third specified ratio (e.g., YES in operation 435), the processor 240, in operation 440, may identify the package of at least one application that is not in use for a specified period based on the list of packages of applications installed in the electronic device 201.

The processor 240 may receive a list of packages of applications installed in the electronic device 201 through the package manager 245. The processor 240 may identify an application that satisfies a specified condition from the list of packages of applications. For example, an application that satisfies a specified condition may include applications that have not been used for a specified period of time (e.g. 32 days) based on whether an application icon exists (e.g., an application executable icon exists on either or both the home screen or menu screen), whether an event related to the use of the application occurs, or whether the application is set to a specific function.

When an application icon exists, the processor 240 may identify whether an event related to the use of the application occurs. For example, when occurrence of an event related to the use of an application is detected through an activity manager (e.g., the activity manager 247 of FIG. 2), the processor 240 may record the usage time of the application. The processor 240 may identify the usage time of the application based on the recorded usage time of the application.

When an application icon exists, the processor 240 may identify whether the application is set to a specific function. For example, the processor 240 registers an observer and, when an application is set to a specific function, records it to identify the usage time of the application. For example, when the application is set as a mobile device management (MDM) function, an accessibility service, or a default application, the processor 240 may determine that the application is set to a specific function. When the application is set to either or both a wallpaper function or a launcher function, the processor 240 may determine that the application is set to a specific function.

In one embodiment, for example, when an event related to the use of the application does not occur for a specified period and the state in which the application is not set to a specific function is maintained for the specified period, the processor 240 may determine the corresponding application as an unused application.

When the application icon does not exist, the processor 240 may identify the last used time of the application component recorded in the package manager 245. The processor 240 may determine an application that is not used for a specified period (e.g., 32 days) as an unused application based on the last used time.

In connection with operation 440 of FIG. 4 described above according to certain embodiments, certain embodiments will be described with reference to FIG. 5 to be described later.

In operation 445, the processor 240 may identify information on the package of at least one application that is not in use for a specified period. The information on the package of the application may include either or both an installation path of the package of the application or information of an instruction set architecture (e.g., 32-bit, 64-bit).

In operation 450, the processor 240 may delete generated artifacts by performing compilation using a package of at least one application that is not in use, based on information on the package of at least one application that is not in use for a specified period. For example, the processor 240 may delete artifacts (e.g., either or both odex, vdex, or art) located in the corresponding path, based on the installation path of the application package and information on the instruction set structure.

In certain embodiments, although not shown, the processor 240 may prevent the artifact of the package of the application included in the block list from being deleted. For example, the block list may be located in the system space and may include a preload application.

In certain embodiments, although not shown, the processor 240 generates a list including applications that affect performance when using the electronic device 201, and it may prevent the artifact of the application package included in the list being deleted.

In certain embodiments, based on the remaining capacity of the memory 220, it is possible to systematically secure the available space of the memory 220, for example, by performing an operation of blocking execution of compilation using the profile of the application or by performing an operation of deleting an artifact generated through execution of compilation using the profile of the application.

Figure 5:
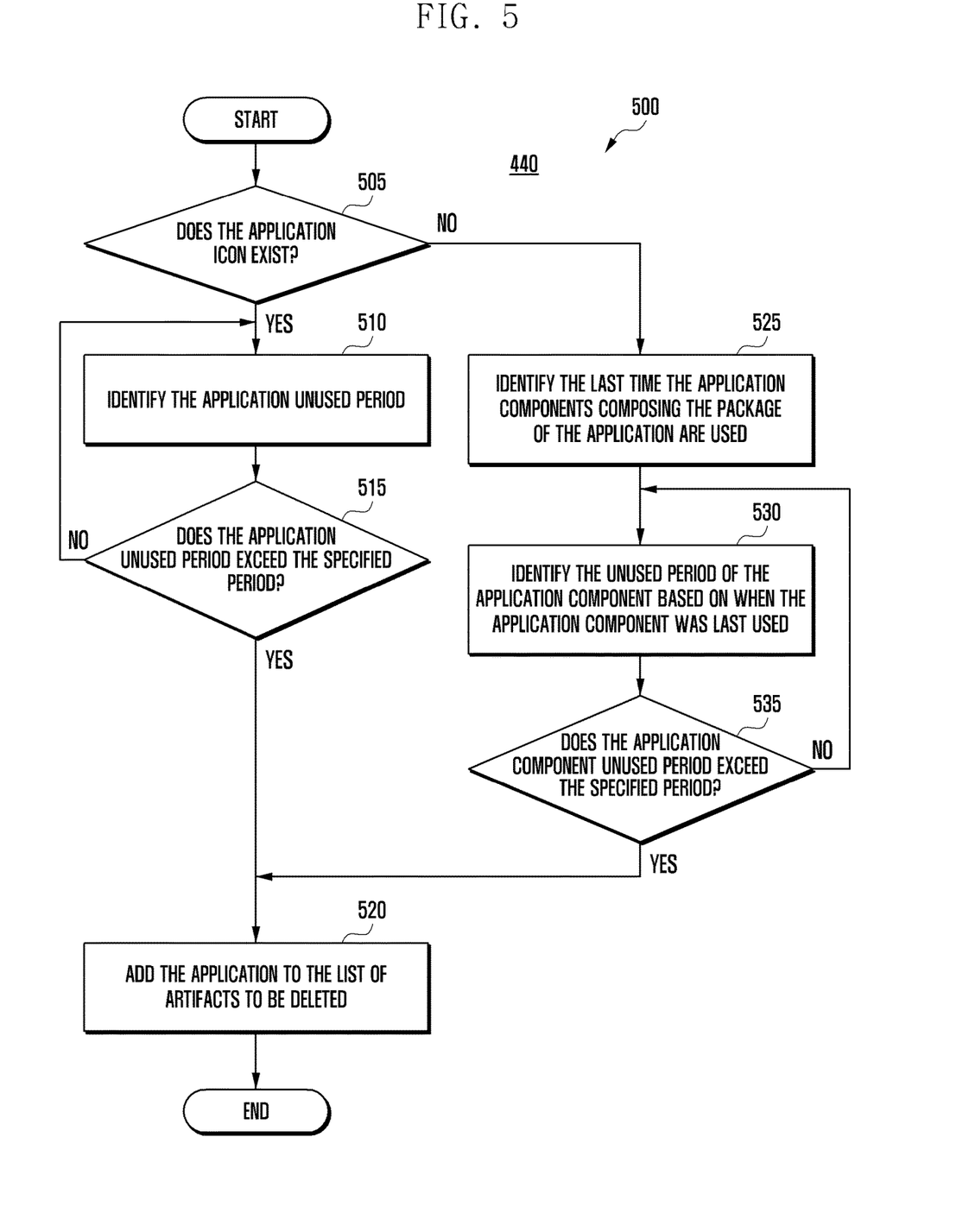
FIG. 5 is a flowchart for explaining operation 440 of FIG. 4 according to certain embodiments.

FIG. 5 is a flowchart 500 for explaining operation 440 of FIG. 4, according to certain embodiments.

With reference to FIG. 5, in operation 505, a processor (e.g., processor 240 of FIG. 2) of an electronic device (e.g., electronic device 201 of FIG. 2) may determine whether an application icon exists. For example, the processor 240 may identify whether the application icon exists on either or both the home screen or menu screen of the electronic device 201.

If the application icon exists (e.g., YES in operation 505), the processor 240 may identify the period that the application is unused during operation 510.

For example, the processor 240 may identify whether an event related to the use of the application occurs. For example, the event related to the use of the application includes an application execution event (e.g., an event that the application is executed based on an input of selecting an application icon), a sharing event using the application (e.g., based on an input of selecting a share button shares content through an application), a pop-up message event (for example, an event for outputting either or both a notification or a message through a toast message), and an event for installing a widget of the application. The processor 240 may identify the unused period of the application based on whether an event related to the use of the application occurs.

The processor 240 may identify whether the application is set to a specific function. For example, when the application is set as a mobile device management (MDM) function, an accessibility service, or a default application, the processor 240 may determine that the application is set to a specific function. When the application is set to either or both a wallpaper function or a launcher function, the processor 240 may determine that the application is set to a specific function. The processor 240 may identify the unused period of the application based on whether the application is set to a specific function.

In operation 515, the processor 240 may identify whether the unused period of the application exceeds a specified period (e.g., 32 days). For example, the processor 240 may identify whether a period in which an event related to the use of an application does not occur exceeds a specified period, and whether a period in which the application is not set as a specific function exceeds a specified period.

When the unused period of the application exceeds the specified period (e.g., YES in operation 515), the processor 240 may add the application to the list of artifacts to be deleted in operation 520. For example, the processor 240 adds an application that is not in use for a specified period to the list to delete an artifact; and, based on information on the package of at least one application that is not in use for the specified period of operations 445 and 450 of FIG. 4 described above, it may delete an artifact generated by performing compilation using at least one application package that is not in use.

When the unused period of the application does not exceed the specified period (e.g., NO in operation 515), the processor 240 may perform operation 510 for identifying the unused period of the application. The disclosure is not limited to such an embodiment. For example, when the unused period of the application does not exceed the specified period (e.g., NO in operation 515), the processor 240 may end the process.

If the application icon does not exist (e.g., NO in operation 505), the processor 240 may identify, in operation 525, the time when the application components constituting the package of the application were last used. For example, in the case of an application that does not have an icon, it may be executed by another application or may be executed implicitly when using a specific function. In this case, the processor 240 may identify the last used time of the application component (e.g., building blocks constituting the package) recorded in the package manager (e.g., the package manager 245 of FIG. 2).

In an embodiment, in operation 530, the processor 240 may identify an unused period of the application component based on the last time the application component was used. In operation 535, the processor 240 may identify whether the unused period of the application component exceeds a specified period.

In an embodiment, when the unused period of the application component exceeds the specified period (e.g., YES in operation 535), the processor 240 may add the application to the list of artifacts to be deleted in operation 520.

In an embodiment, when the unused period of the application component does not exceed the specified period (e.g., NO in operation 535), the processor 240 may perform operation 530 to identify the unused period of the application component based on the usage time of the application component. The disclosure is not limited to such an embodiment. For example, the unused period of the application component does not exceed the specified period (e.g., NO in operation 535), the processor 240 may end the process.

Figure 6:
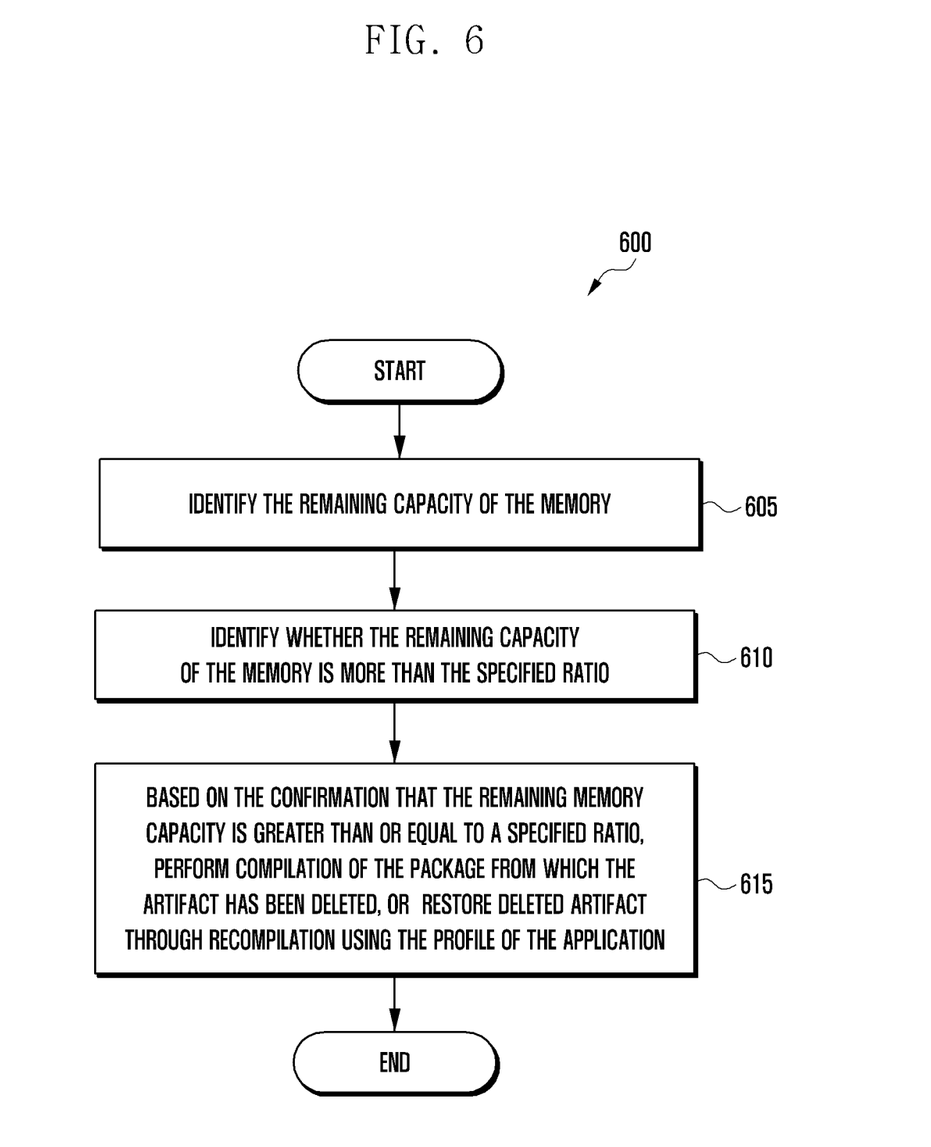
FIG. 6 is a flowchart illustrating a method of managing a memory based on the remaining capacity of the memory, according to certain embodiments.

FIG. 6 is a flowchart 600 for explaining a method of managing the memory 220 based on the remaining capacity of the memory 220, according to certain embodiments.

Operations of FIG. 6 according to certain embodiments may be additional operations of operation 450 of FIG. 4 described above.

With reference to FIG. 6, in operation 605, the processor (e.g., the processor 240 of FIG. 2) of the electronic device (e.g., the electronic device 201 of FIG. 2) identifies (e.g., checks) the remaining capacity of a memory (e.g., the memory 220 of FIG. 2); and, in operation 610, it may identify (e.g., determine) whether the remaining capacity of the memory 220 is greater than or equal to a specified ratio.

In certain embodiments, as shown in FIG. 3, the specified ratio may include a ratio of available capacity among the total capacity of the memory 220. The specified ratio may include a plurality of specified ratios, such as a first specified ratio (e.g., 8%), a second specified ratio (e.g., 5%), and a third specified ratio (e.g., 1%). The foregoing are provided by way of example, and not limitation.

In one embodiment, the processor 240, in operation 615, based on the identification that the remaining capacity of the memory 220 is greater than or equal to a specified ratio, may restore the deleted artifact by compiling the package from which the artifact was deleted, or by recompiling using the application profile.

For example, if the remaining capacity of the memory 220 is identified to be greater than or equal to the third specified ratio, the processor 240 may compile the package from which the artifact is deleted. The artifact of a compiled package can be generated. In certain embodiments, when the remaining capacity of the memory 220 is secured to be greater than or equal to the third specified ratio, it is supported to immediately compile the package from which the artifact has been deleted, and result of performance degradation in using the application may be avoided.

As another example, if the remaining capacity of the memory 220 is confirmed to be greater than or equal to the second specified ratio, the processor 240 may restore the deleted artifact through recompilation using the profile of the application. For example, the processor 240 may perform recompilation based on the Java code file and the profile of the application. The processor 240 may restore the deleted artifact by performing recompilation. In this case, the processor 240 may restore the application usage point.

In certain embodiments, when the profile of the application does not exist, the processor 240 may restore the application to the point in time when the application is installed using a Java code file.

In another embodiment, when the remaining capacity of the memory 220 is confirmed to be greater than or equal to the third specified ratio, the processor 240 may compile, based on the Java code file, to restore only the basic function of the application. If it is confirmed that the remaining capacity of the memory 220 is greater than or equal to the second specified ratio greater than the third specified ratio, the processor 240 may compile based on the profile of the application and restore the application to the point of use.

In certain embodiments, when the remaining capacity of the memory 220 is secured at a specified ratio or more, the processor 240 performs an operation for restoring the differentially deleted product. For example, the performance degradation of the application may be prevented by compiling the package from which the artifact is deleted or by performing recompilation using the profile of the application.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., through wires), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
    a memory; and
    a processor operatively coupled to the memory,
    wherein the processor is configured to:
    identify a remaining capacity of the memory, and
    when the remaining capacity of the memory is less than a specified ratio of a total capacity of the memory, delete an artifact generated through compilation of an update file for an application using a profile of the application.

2. The electronic device of claim 1, wherein the specified ratio comprises a first specified ratio, a second specified ratio, and a third specified ratio, and
    wherein the processor is further configured to:
    based on determining that the remaining capacity of the memory is between the first specified ratio and the second specified ratio that is smaller than the first specified ratio, identify the profile for a method of a frequently used application, and
    block execution of compilation using the profile for the method of the frequently used application.

3. The electronic device of claim 2, wherein the processor is further configured to:
    based on determining that the remaining capacity of the memory is between the second specified ratio, and the third specified ratio that is smaller than the second specified ratio, identify a path of a system package that is not in use by performing an update, and
    delete an artifact generated by performing compilation of the system package located in the identified path.

4. The electronic device of claim 3, wherein the processor is further configured to:
    based on determining that the remaining capacity of the memory is less than the third specified ratio, obtain a list of packages of applications installed in the electronic device,
    identify a package of at least one application that is not in use for a specified period from the obtained list,
    identify information including at least one of information of an instruction set architecture or an installation path of the package of at least one application that is not in use for the specified period,
    based on the installation path of the package of the at least one application that is not in use for the specified period or the information of the instruction set architecture, identify the path in which an artifact of the package of the at least one application that is not in use is located, and
    delete the artifact located in the path.

5. The electronic device of claim 4, wherein the processor is further configured to:
    identify whether icons of each of the applications included in the obtained list exist,
    if an icon for each of the applications exists, based on whether an event of execution of each application, a sharing event using each application, a pop-up message event of each application, and an event of installing a widget of each application occur, and whether each of the applications is set to a specific function, identify an unused period of each application, and
    add at least one application whose unused period exceeds the specified period to a list of artifacts to be deleted.

6. The electronic device of claim 5, wherein the processor is further configured to:
    if the icon of each of the applications does not exist, identify a time when an application component constituting a package of each application was last used,
    based on the time the application component was last used, identify the unused period of the application component, and
    add at least one application component whose unused period exceeds a specified period to the obtained list to delete the artifact.

7. The electronic device of claim 4, wherein the processor is further configured to:
    after deleting the artifact, compile the package from which the artifact was deleted based on determining that the remaining capacity of the memory is greater than or equal to the third specified ratio.

8. The electronic device of claim 4, wherein the processor is further configured to:
    after deleting the artifact, based on determining that the remaining capacity of the memory is greater than or equal to the second specified ratio, restore the deleted artifact through recompilation using the profile of the application.

9. The electronic device of claim 8, wherein the processor is further configured to:
    based on determining that the remaining capacity of the memory is greater than or equal to the second specified ratio, perform the recompilation based on a Java code file and the profile of the application.

10. The electronic device of claim 4, wherein the processor is further configured to:

after deleting the artifact, based on determining that the remaining capacity of the memory is greater than or equal to the third specified ratio, by performing compilation based on a Java code file, restore a basic function of the application, and based on determining that the remaining capacity of the memory is greater than or equal to the second specified ratio greater than the third specified ratio, by performing compilation based on the profile of the application, restore to a point of use of the application.

11. A method for managing a memory of an electronic device, the method comprising:

identifying a remaining capacity of the memory; and when determining that the remaining capacity of the memory is less than a specified ratio of a total capacity of the memory, deleting an artifact generated by performing a compilation of an update file for an application using a profile of the application.

12. The method of claim 11, wherein the specified ratio includes a first specified ratio, a second specified ratio, and a third specified ratio, and wherein the deleting the artifact comprises:

based on determining that the remaining capacity of the memory is between the first specified ratio and the second specified ratio, the second specified ratio less than the first specified ratio, identifying the profile for a method of a frequently used application; and blocking execution of compilation using the profile for the method of the frequently used application.

13. The method of claim 12, wherein the deleting the artifact comprises:

based on determining that the remaining capacity of the memory is between the second specified ratio and the third specified ratio, the third specified ratio smaller than the second specified ratio, identifying a path of an unused system package by performing an update; and deleting the artifact generated by performing compilation of a system package located in the identified path.

14. The method of claim 13, wherein the deleting the artifact comprises:

based on the remaining capacity of the memory is less than the third specified ratio that is smaller than the second specified ratio, obtaining a list of packages of applications installed in the electronic device;

identifying a package of at least one application that is not in use for a specified period from the obtained list;

identifying information including at least one of information of an instruction set architecture of an installation path of the package of at least one application that is not in use for the specified period;

based on the installation path of the package of the at least one application that is not in use for the specified period or the information of an instruction set architecture information, identifying the path in which the artifact of the package of the at least one application that is not in use is located; and deleting the artifact located in the path.

15. The method of claim 14, wherein the identifying the package of the at least one application that is not in use comprises:

identifying whether an icon of each of the applications included in the obtained list exists;

if the icon for each of the applications exists, based on whether an event of execution of each application, a sharing event using each application, a pop-up message event of each application, and an event of installing a widget of each application occur, and whether each application is set to a specific function, identifying an unused period of each application; and adding at least one application for which the unused period exceeds the specified period to a list of artifacts to be deleted.

16. The method of claim 15, further comprising:

if the icon of each of the applications does not exist, identifying when an application component constituting a package of each application was last used;

based on time the application component was last used, identifying an unused period of the application component; and adding at least one application component for which the unused period exceeds the specified period to the obtained list of artifacts to be deleted.

17. The method of claim 14, further comprising:

after deleting the artifact, based on determining that the remaining capacity of the memory is greater than or equal to the third specified ratio, compiling the package from which the artifact has been deleted.

18. The method of claim 14, further comprising:

after deleting the artifact, based on determining that the remaining capacity of the memory is greater than or equal to the second specified ratio, restoring the deleted artifact through recompilation using the profile of the application.

19. The method of claim 18, wherein the restoring the deleted artifact through the recompilation comprises:

based on determining that the remaining capacity of the memory is greater than or equal to the second specified ratio, performing the recompilation based on a Java code file and the profile of the application.

20. The method of claim 14, further comprising:

after deleting the artifact, based on determining that the remaining capacity of the memory is greater than or equal to the third specified ratio, restoring a basic function of the application by performing compilation based on a Java code file; and based on determining that the remaining capacity of the memory is greater than or equal to the second specified ratio greater than the third specified ratio, by performing compilation based on the profile of the application, restoring to a point of use of the application.

* * * * *